Dec. 8, 1959   W. J. COULTAS   2,915,869
DEFLECTOR MEANS FOR CROP CONDITIONER
Filed Oct. 14, 1957
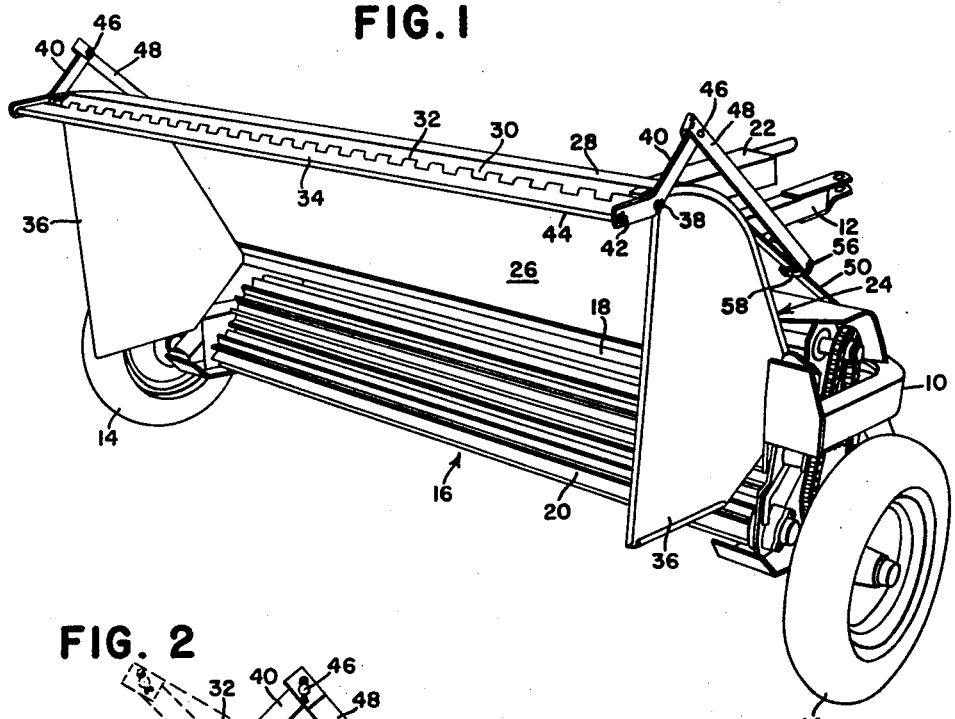
FIG. I
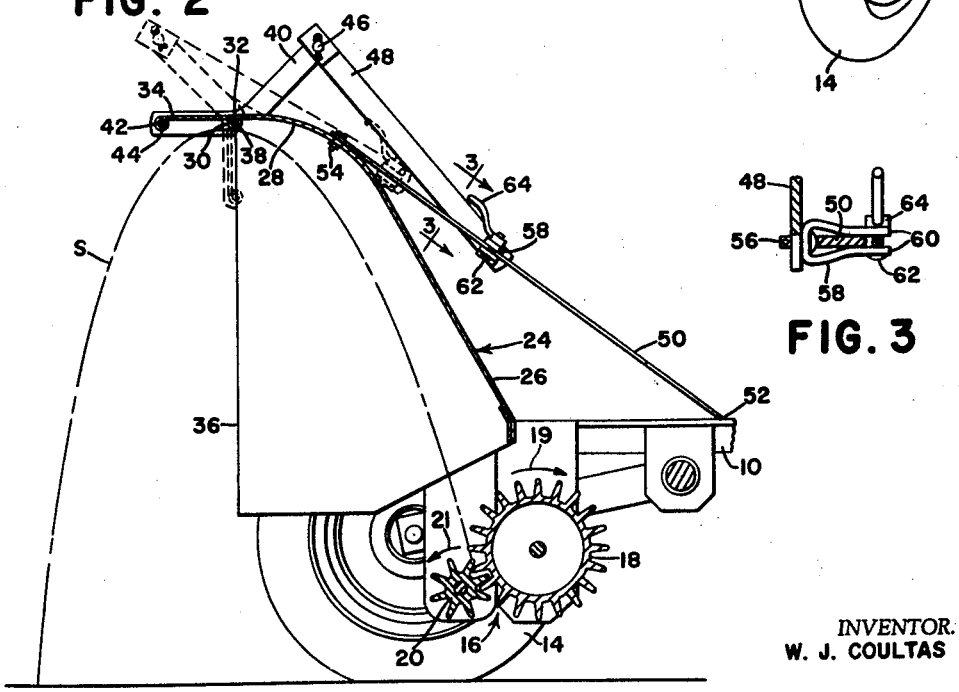
FIG. 2
FIG. 3
INVENTOR.
W. J. COULTAS

2,915,869

DEFLECTOR MEANS FOR CROP CONDITIONER

Wilbur J. Coultas, Moline, Ill., assignor, by mesne assignments, to Deere & Company, a corporation of Delaware Application October 14, 1957, Serial No. 689,885

5 Claims. (Cl. 56—1)

This invention relates to a crop conditioner and more particularly to deflector means therefor having as its principal purpose the provision of such means, preferably in the form of an attachment, for acting on the hay or other crops discharged by the conditioner.

A typical conditioner such as shown in the U.S. patent to Cunningham 2,711,622 comprises a mobile frame adapted to advance over a field of previously harvested crops, and this mobile frame carries crop conditioning means, for example in the form of a pair of cooperative corrugated rollers disposed transverse to the line of advance, which operate to pick up the crop, to pass the crop therethrough and while so doing to break or crush the stems so as to accelerate the curing or drying, and to discharge the crop upwardly and rearwardly in the form of a trajectory for ultimate redeposit on the ground to be picked up later. The present invention finds particular utility in association with a machine of that character and comprises a shield or similar structure arranged on the machine to be disposed ahead of the stream of discharged crops, but the shield has a rearwardly directed portion substantially at the peak of the stream for controlling the discharge and confining it generally to a desirable trajectory, in addition to which the deflector prevents the wind from scattering the stream. As an adjunct to this deflector, the invention provides a deflector flap hinged to the rear terminal edge of the shield and vertically adjustable among several positions, particularly between an upper position forming a rearward extension of the shield and a downward position in which the flap depends from the terminal edge of the shield somewhat into the path of the discharged stream so as to intercept the stream in part whereby to create a fluffing action on the crops before the crops are redeposited on the ground. The invention has for other features the provision of the flap in a simple and expedient manner, means for adjusting the flap, novel means for securing the positions of adjustment, the combination of the adjustment means with brace means for the shield, and the provision of the shield and deflector flap as an attachment for machines already in existence.

The foregoing and other important objects and desirable features inherent in and encompassed by the invention will become apparent as a preferred embodiment of the invention is disclosed, by way of example, in the ensuing description and accompanying sheet of drawings, the several figures of which are described immediately below.

Fig. 1 is a rear perspective view of a crop conditioner having the shield and deflector means thereon.

Fig. 2 is a longitudinal section of the machine showing the deflector flap in its lowermost position in broken lines.

Fig. 3 is an enlarged fragmentary section on the line 3—3 of Fig. 2 and illustrating the details of the locking means for the adjusting means.

As already indicated, the basic machine is of the character forming the subject matter of the above-identified Cunningham patent. To this end, the machine is illustrated as comprising a main frame 10 having a draft tongue 12 by means of which the machine may be drawn by a tractor (not shown) over a field of previously harvested hay or like forage crop. Mobility of the frame is achieved by laterally spaced apart ground engaging wheels 14 and the frame carries generally between these wheels and transverse to the line of advance crop conditioning means indicated in its entirely by the numeral 16 and here shown as comprising a large corrugated roll 18 and a smaller corrugated roll 20. The rolls are driven in the directions of the arows 19 and 21 as shown in Fig. 2 by power derived from the tractor by means of a shielded propeller shaft assembly 22.

As the machine advances, with the rolls 18 and 20 rotating as indicated, the previously harvested swath is picked up, passed through the rolls, and discharged rearwardly and upwardly in a trajected stream S for redeposit on the ground behind the machine, the purpose of the conditioning action being to break, crush and stretch the stems so as to accelerate the release of moisture therefrom with the result that the stems will dry or cure at approximately the same rate as the leaves. The stream S is controlled to some extent by a shield means 24 carried by the main frame 10 ahead of the conditioning means 16 so that said shield means has a transverse front portion 26 disposed ahead of the front part of the stream S and an upper rearwardly direction portion 28 lying generally at the top or peak of the stream and terminating in a transverse rear terminal edge 30 which here affords part of hinge means 32 for the rockable mounting of a transverse deflector flap 34.

As shown in Fig. 1, the deflector flap has an upper position in which it extends generally horizontally rearwardly at the level of the terminal edge 30 of the shield 24 and thus is effective only on the extreme peak of the stream. Fig. 2 shows in dotted lines a maximum downward position of the flap 34 in which it depends from the terminal edge 30 so as to intercept at least part of the stream, whereby to create a fluffing action on the crops discharged by the conditioning means 16. The shield 24, in addition to the function already described, prevents the wind from scattering the crops in the stream and as an adjunct to this phase of its function it is equipped with opposite fore-and-aft end walls 36.

The hinge at 32 includes a transverse pivot rod 38 which mounts at each end thereof an adjusting arm 40 having a connection 42 with the rear rolled edge 44 of the flap 34. Each arm extends forwardly and upwardly in the form of a bell crank and is pivotally connected at 46 to a downwardly and forwardly extending link 48. The shield means 24 is braced at each side by elongated fore-and-aft extending brace means or members 50, a forward portion of each of which is rigidly connected at 52 to a forward portion of the frame 10 and a rearward portion of each of which is connected at 54 to an upper front portion of the shield 24.

It is a feature of the invention to utilize the brace means as part of the means for adjusting and securing the adjustment of the deflector flap 34. For this purpose, the forward end of each link is pivotally connected at 56 to the bight of a slide element 58 in the form of a bifurcated part having opposite legs 60 straddling the associated brace member 50 (Fig. 3). The legs 60 extend laterally past the inner side of the brace member 50 and are apertured in alinement to receive a bolt 62 on which is threaded a tail nut 64. When the nut is tightened on the bolt 62 it clamps the legs together with the brace 50 between them, thus preventing sliding of the element 58 along the brace and consequently securing the adjusted position of the flap 34 via the associated arm 40. When it is desired to adjust the flap, the tail nut 64 is loosened so as to permit uphill and downhill sliding of the element 58 along the brace, and when the desired position is achieved, the tail nut is tightened. Thus, the bolt 62 and tail nut 64 comprise a locking device for the adjusting means between the flap and the brace means 50. In a preferred structure, the adjusting and locking means are the same at both sides of the machine.

In addition to the features already described, another feature is the adaptability of the entire shield and flap structure, together with its bracing and adjusting means as an attachment for existing machines. A subsidiary but important feature of combining the brace and adjusting means is that the brace means must be used to brace the shield and also to operate in the selective fixing of the adjusted position of the flap. Hence, each brace means serves a dual function and the user is not apt to omit the brace means, because he will require them for the adjusting function of the structure.

Features in addition to the foregoing, as well as variations in the preferred embodiment disclosed, will readily occur to those versed in the art, all of which may be achieved without departure from the spirit and scope of the invention.

What is claimed is:

1. A deflector attachment for a crop conditioner having a mobile frame carrying relatively wide crop-treating rolls transverse to the line of advance and operative to pick up crops and to discharge them upwardly and rearwardly and then downwardly to the ground in a trajected stream, said deflector attachment comprising: an upright relatively wide shield having means adapted for attachment to the frame immediately above and parallel to the rolls and said shield being shaped to extend upwardly and rearwardly from a lower portion near the rolls to a transverse terminal rear edge portion at a relatively higher level and adapted to lie generally at the peak of the trajected stream; brace means extending downwardly and forwardly from laterally outer portions of an upper part of the shield toward the frame and having means adapted for attachment to the frame; a transverse rearwardly directed deflector flap commensurate in width with and movably mounted on the terminal edge of the shield for selective adjustment between an upper rearward position generally at the level of said terminal edge and a down position depending from said edge so as to be selectively positionable into the path of the stream; an arm secured to the flap for moving the flap; and means connected to the arm and selectively settable on the brace means for fixing a selected position of the flap.

2. The attachment defined in claim 1, in which: the brace means includes an elongated fore-and-aft member and the means connected to the arm and settable on the brace means comprises a slide element movable lengthwise of the brace member, a link connected to said element and to the arm, and a lock device for selectively fixing the element against movement along said member.

3. The attachment defined in claim 2, in which: the slide element comprises a bifurcated part having legs straddling the brace member, and the lock device operates to clamp and release said legs on and from the member.

4. A deflector attachment for a crop conditioner having a mobile frame carrying relatively wide crop-treating rolls transverse to the line of advance and operative to pick up crops and to discharge them upwardly and rearwardly and then downwardly to the ground in a trajected stream, said deflector attachment comprising: an upright relatively wide shield having means adapted for attachment to the frame immediately above and parallel to the rolls and said shield being adapted to extend upwardly and rearwardly from a lower portion near the rolls to a transverse rear terminal edge portion at a relatively higher level and adapted to lie generally at the peak of the trajected stream; a transverse deflector flap commensurate in width with and movably mounted on the terminal edge of the shield for selective adjustment between an upper rearward position generally at the level of said terminal edge and a down position depending from said edge so as to be selectively positionable into the path of the stream; and means connected to the flap for selecting positions of the flap between its upper and down positions.

5. The attachment defined in claim 4, including a pair of fore-and-aft side sheets spaced apart on the order of the width of the shield and disposed beneath the shield and adapted to extend forwardly toward the frame to combine with said shield to afford a box-like structure at the rear of the crop conditioner.

References Cited in the file of this patent

UNITED STATES PATENTS

| | | |
|---|---|---|
| 2,270,208 | Lindgren et al. | Jan. 13, 1942 |
| 2,496,472 | Huddle | Feb. 7, 1950 |
| 2,701,595 | Berger et al. | Feb. 8, 1955 |
| 2,701,940 | Carr | Feb. 15, 1955 |
| 2,708,582 | Adams | May 17, 1955 |
| 2,711,622 | Cunningham | June 28, 1955 |
| 2,811,004 | Borrow | Oct. 29, 1957 |
| 2,827,745 | Taylor | Mar. 25, 1958 |